F.M. SYNCHRONOUS DETECTOR SYSTEM
Filed Dec. 10, 1962
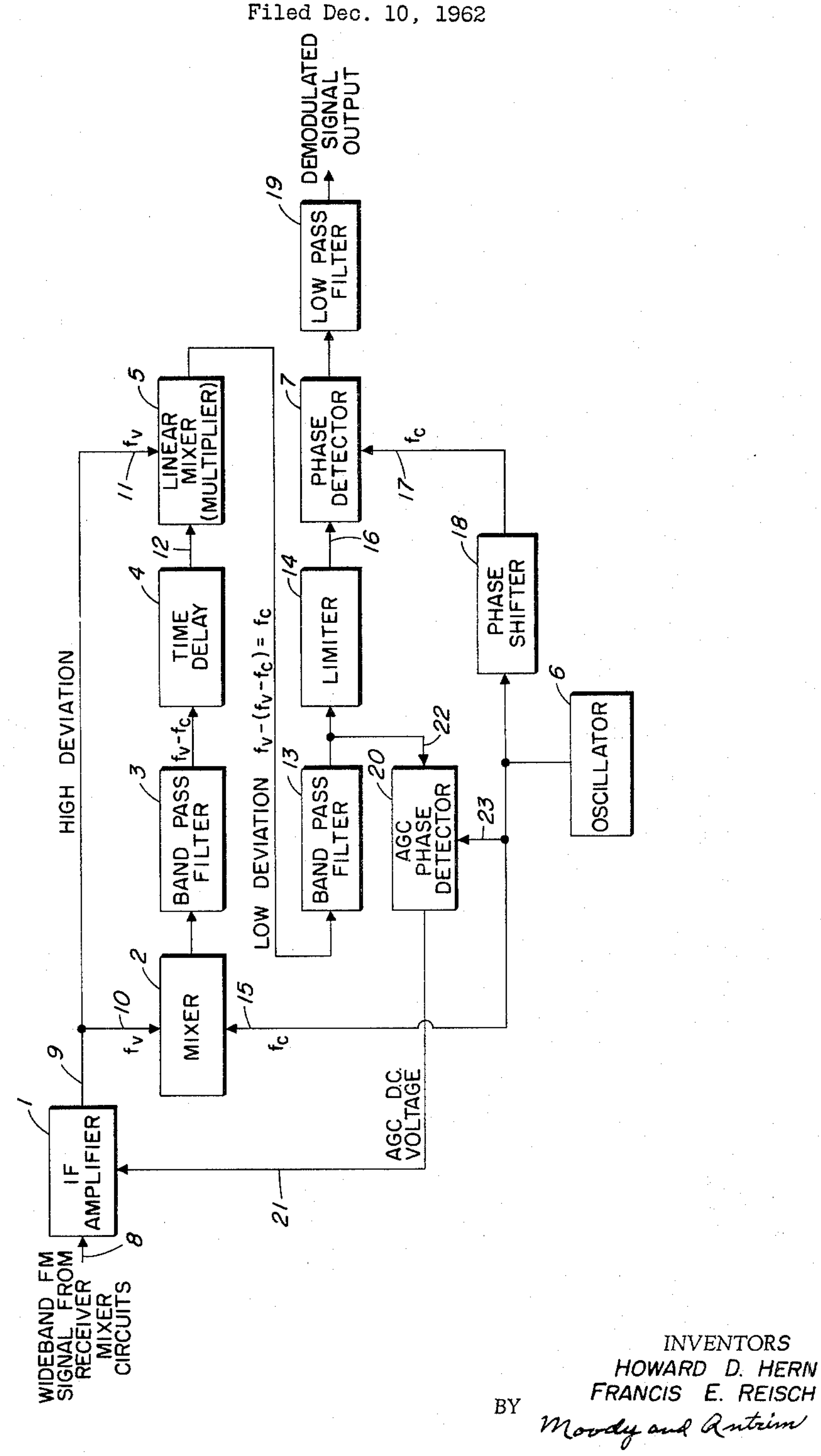
INVENTORS
HOWARD D. HERN
FRANCIS E. REISCH
BY
Moody and Antrim
AGENTS United States Patent Office 3,210,667
Patented Oct. 5, 1965

3,210,667
F.M. SYNCHRONOUS DETECTOR SYSTEM

Howard D. Hern and Francis E. Reisch, Richardson, Tex., assignors to Collins Radio Company, Cedar Rapids, Iowa, a corporation of Iowa Filed Dec. 10, 1962, Ser. No. 243,498
4 Claims. (Cl. 325—345)

This invention pertains to frequency-modulation (F.M.) and phase-modulation detector systems and particularly to systems that have low threshold level to provide intelligible reception of signals when the ratio of signal-to-noise is low.

In F.M. systems, or in other angular modulation systems, modulating signal provides wide deviation of transmitted signals in order to detect a modulating signal clearly at a remote receiving station when interferences from either unwanted signals or noise pulses are at a substantial level. Usually the full deviation of the transmitted signal is retained on the received signal until it is applied to the discriminator. The selective circuits that precede the discriminator must necessarily have wide-band pass characteristics to pass all the significant sidebands of the modulated signal. For signals substantially above threshold, the signal-to-noise ratio of the demodulated signal has been shown to be independent of the bandwidth of the receiving circuits. However, weak signals near the threshold can be made more understandable when a narrow bandwidth is used for the threshold is at a lower level when the bandwidth is decreased. This threshold is defined as being the level of the signal at the input of the demodulator at which the signal-to-noise ratio begins to decrease rapidly for decreasing levels of signal.

Usually, in order to prevent intermodulation distortion, the bandwidth of the receiver should be maintained wide enough to receive the full spectrum of the significant sidebands of the transmitted signal. However, the wide bandwidth required to accommodate the wide deviation is desirable only until the threshold is approached. When the signal becomes noisy, the threshold of the detector can be decreased by decreasing the bandwidth of the amplifier circuits that precede the discriminator so that distorted but understandable signal may be received in preference to an excessively noisy signal. A system that automatically compromises between noise and intermodulation distortion is described in U.S. Patent 2,969,459, "Methods and Means For Reducing The Threshold of Angular Modulated Receivers," issued to Howard D. Hern on January 24, 1961.

A system that utilizes a wide bandwidth until after the received signal is amplified and then utilizes a narrow bandwidth before application of the signal to a discriminator is preferred. Such a system has the advantage of favorable signal-to-noise ratio that results from wide deviation and also the advantage of low threshold of the discriminator that results from narrow bandwidth. A negative feedback system, as described in the article, "The Application of Negative Feedback to Frequency-Modulation Systems," by J. G. Chaffee published in volume 27, Number 5, May 1939, issue of Proceedings of I.R.E. (Institute of Radio Engineers), decreases the deviation of the signal before it is applied to a discriminator. The discriminator that is shown in the article is the type that depends upon the characteristics of anti-resonant circuits. In order that the discriminator functions over the linear portion of its characteristic curve, the frequency of the local oscillator must be quite accurately controlled so that the center frequency of the carrier corresponds to the frequency at which the output of the discriminator is zero. Also a corrective phase network must be included in the feedback circuit to compensate for different amounts of phase shift encountered by different modulating frequencies in the feedback loop so that the frequency deviation will be reduced in the same proportion for different modulating frequencies.

According to the present invention, the favorable signal-to-noise ratio that is obtained from wide frequency deviation of the incoming signal, and also the low discriminator threshold and low distortion that are obtained from a synchronous detector for signals of small frequency deviation, are realized by a relatively simple circuit arrangement. The incoming signal is converted in a frequency converter to a signal with low deviation and with a center frequency corresponding exactly to the frequency of a local oscillator that is connected to the converter. Whereas the input signal to the converter may be frequency modulated, the output of the converter is phase-modulated for application to a phase detector. The converted signal is applied to a synchronous detector that has its reference input connected to the local oscillator. Since the converted signal and the reference signal applied to the detector are derived from the same oscillator, normal drift of the oscillator does not disturb operation of the system and frequency control circuits for the oscillator are not required.

An object of this invention is to utilize circuits of relatively simple design to decrease the deviation of received angular modulator signals before application to detector circuits in order to obtain favorable signal-to-noise ratio and also low threshold of the detector.

Another object is to utilize a circuit arrangement that permits the use of a synchronous detector without requiring frequency control circuits for controlling a local oscillator.

The following description and the appended claims may be more readily understood with reference to the accompanying drawing in which the single figure shows a block diagram of the synchronous detector receiving system of this invention.

Briefly, the synchronous detector system of this invention includes a conventional wide-band intermediate-frequency amplifier 1 that applies signal to two different inputs of a modulation transfer unit. The modulation transfer unit as shown in the accompanying drawing comprises an input mixer 2, a band-pass filter 3, a time delay element 4, a linear mixer (multiplier) 5, and a band-pass filter 13. An oscillator 6 applies signal to the mixer 2 and also to a phase detector 7. The output converted signal of the modulation transfer unit has a center frequency that is equal to the frequency of the oscillator signal that is applied to mixer 2 and has modulation frequency deviation that is proportional to the deviation on the incoming signal and to the delay of the time delay element 4. As described below, the delay in time between the signals that are derived from the intermediate-frequency amplifier and are applied to the two inputs of the linear mixer 5 is chosen to provide a signal that has relatively small deviation compared with that of the incoming signal.

The converted signal that requires a relatively narrow bandwidth is then limited in amplitude and applied to the signal input of the phase detector 7, and reference signal of proper phase for synchronous detection is applied from oscillator 6 to its other input. The output of the detector 7 is demodulated signal that is intelligible when the signal-to-noise ratio is below those threshold conditions that would prevent intelligibility in systems that do do not permit utilization of both wide deviation of the transmitted signal and small deviation of the signal that is applied to the detector.

In detail, F.M. signal from conventional low-noise receiver input circuits is applied to input 8 of an intermediate-frequency amplifier 1. In order to obtain favorable signal-to-noise ratio, the deviation or the modulation index of the signal is relatively high. The signal which is represented as having a carrier frequency $f_v$ is applied to the input 10 of the mixer 2 and also, to the input 11 of the linear mixer 5. The oscillator 6 applies signal with the frequency $f_c$ to the input 15 of the mixer 2. The output of the mixer 2 is applied through the band-pass filter 3 to the input of the time delay circuit 4. When the circuit is to use the difference beat frequency rather than the sum beat frequency, the band-pass filter 3 passes the difference beat frequency from the output of the mixer. The bandwidth is sufficient to pass the significant sidebands of the modulated beat frequency according to the modulation of the signal that is applied to input 10 of the mixer 2. While the signal is not modulated, the output of the band-pass filter may be represented as $f_v-f_c$. The time delay circuit 4 may comprise a length of coaxial line. As described below, the delay required is determined by the amount of deviation that is desired from the output of the linear mixer 5.

The output of the time delay circuit 4 is applied to the input 12 of the linear mixer 5 to be mixed with the frequency modulated signal that is applied to input 11 of the mixer. The output of the mixer 5 is applied through band-pass filter 13 to the input of the amplitude limiter 14. The band-pass filter 13 passes a difference beat frequency. Disregarding the sidebands provided by modulation, the difference signal is $f_v-(f_v-f_c)=f_c$. While the incoming signal is wide band frequency-modulated signal, the output of the band-pass filter 13 is narrow band phase modulated signal. Regardless of any drift in the frequency of oscillator 6 or the center frequency of the incoming signal, the beat frequency $f_c$, which is now effectively the carrier frequency, is always equal to the frequency of the oscillator.

The limiter 14 is a conventional limiter that limits the amplitude to provide signal of constant amplitude to input 16 of the phase detector 7. The signal applied to input 16 is phase modulated in accordance with the frequency modulation of the incoming signal. The reference input 17 of the detector is connected through phase shifter 18 to the output of the oscillator 6. The combination of the signals applied to the inputs of the phase detector 7 provide a demodulated signal that is passed through a low pass filter 19 to an output circuit.

In order to control the amplitude of the incoming signal so that linear mixer 5 is operated at a level that provides an output that is proportional to both of its inputs, automatic-gain-control phase detector 20 is provided for controlling the gain of the intermediate-frequency amplifier 1. Phase modulated signal that has relatively low deviation is applied from the output of band-pass filter 13 to input 22 of the phase detector 20. The other input 23 of the phase detector is connected to the output of oscillator 6. The carrier signal applied to the input 22 and the oscillator signal applied to the input 23 are substantially in phase so that the phase detector 20 functions to provide a direct-current voltage output that is proportional to the amplitude of the signal applied to the input 22. This direct-current voltage is applied as a gain-control voltage to conductor 21 that is connected to gain-control circuits of the intermediate-frequency amplifier 1. The gain of the amplifier is controlled in the conventional manner to maintain its output substantially constant in amplitude.

Let the frequency-modulated signal at the output 9 of the intermediate-frequency amplifier 1 be represented as:

$$A \cos (\omega_v + \Delta\omega \cos Pt)$$

where:

$P$=frequency of the angular modulating signal, $\omega_v = 2\pi f_v$, $f_v$ being the carrier frequency of the intermediate-frequency signal, $\Delta\omega$=angular deviation of the carrier frequency, $t$=time, and $A$=a constant proportional to amplitude of the signal.

The usual mathematical analysis may be applied to derive the output of the mixer 2. The frequency-modulated signal is combined with the signal of the oscillator 6 that is operating at a frequency $f_c$. After the lower beat frequency components have passed through the band-pass filter 3 and through the time delay circuit 4 that has a time delay T, the signal that is applied from the delay circuit to the input of mixer 5 is $$A_1 \cos [(\omega_v-\omega_c)(t+T)+\Delta\omega \cos P(t+T)]$$

where:

$A_1$ is the amplitude after mixing, and $\omega_c = 2\pi f_c$, $f_c$ being the frequency of the signal of oscillator 6.

The mixer 5 functions as a multiplier. Multiplying the two equations that represent the signals that are applied to its inputs 11 and 12, the output may be expressed as $$A_2 \cos [\omega_c t-(\omega_v-\omega_c)T+\Delta\omega \cos Pt-\Delta\omega \cos P(t+T)]$$

For simplification, let $$(\omega_v-\omega_c)\,T=\phi$$

and let $$\Delta\omega \cos Pt-\Delta\omega \cos P(t+T)=2\Delta\omega \sin\frac{PT}{2} \sin Pt+\left(\frac{PT}{2}\right)$$

Upon substituting, the output of mixer 5 reduces to $$A_2 \cos \left[\omega_c t+2\Delta\omega \sin\frac{PT}{2} \sin\left(Pt+\frac{PT}{2}\right)-\phi\right]$$

Rearranging the terms, the output becomes $$A_2 \cos \left[\omega_c t+\Delta\omega PT\left(\frac{\sin\frac{PT}{2}}{\frac{PT}{2}}\right) \sin\left(Pt+\frac{PT}{2}\right)-\phi\right]$$

Further, in practice the time delay is chosen so that $$\frac{\sin\frac{PT}{2}}{\frac{PT}{2}}$$

is approximately 1, then the approximate expression for the output reduces to $$A_2 \cos \left[\omega_c t+\Delta\omega PT \sin\left(Pt+\frac{PT}{2}\right)-\phi\right]$$

From this equation, the peak deviation at the input of phase detector 7 may be represented as $\Delta\omega$PT where:

$\Delta\omega$=peak deviation of the intermediate-frequency signal in radians, $P$=frequency of the modulating signal in radians, and $T$=time delay in seconds introduced namely by time delay 4.

The deviation ratio $$\frac{\Delta\omega PT}{P}$$

is merely $\Delta\omega$T that is independent of the modulating frequency P.

When the signals to both inputs 11 and 12 are noisy, an accurate mathematical expression to show the effects of noise becomes complicated. For a theoretical discussion, refer to the article, "The Effect of Mixing Two Noisy Signals," by N. A. Huttly published in The Marconi Review, volume XXIII, Number 139, Fourth Quarter 1960. Tests for vertifying the mathematical results show that when the signal inputs to the mixer are correlated, the noise phase deviation ratio at the output of the mixer is reduced in the same manner as the signal deviation ratio.

In practical design, the mixer 5 has a threshold level for satisfactory operation at a signal-to-noise ratio at its input of 0 db (decibels) and the detector circuits including limiter 14 and phase detector 7 have a threshold level that permits capture of phase modulated signal with a signal-to-noise ratio at its input of about 8 decibels. The practical operation of the circuit may be more clearly understood with reference to the following example. The intermediate-frequency amplifier 1 has a bandwidth of 2.8 mc. (megacycles per second) with a center frequency of 70 mc. The frequency of oscillator 6 is 13 mc. so that the difference beat frequency ($f_v-f_c$) at the output of band-pass filter 3 is 57 mc. The maximum deviation ($\Delta\omega$) of the input signal is 1 mc. or $2\pi\times10^6$ radians per second and the highest frequency (P) of the modulating signal is 100 kc. (kilocycles per second) or $2\pi\times10^5$ radians per second. The bandwidth of band-pass filter 13 need be only 200 kc. when the time delay of the delay circuit 4 is .08 microsecond. The improvement in noise threshold of this system over one that does not use a modulation converter and narrow band techniques may be about 10 db.

Although this invention that comprises in combination a modulation converter and a synchronous detector has been shown in a single embodiment that is applicable to receive frequency modulated signals, it may be modified for use in different angular modulation receivers and still be within the sphere and the scope of the following claims.

What is claimed is:

1. A synchronous detector system for demodulating angular-modulated signal comprising an amplifier for receiving incoming wide-deviation angular-modulated signal, a modulation transfer means having first, second, and third inputs and an output, a synchronous phase detector means having a first input for receiving angular modulation signal, a second input for receiving reference signal, and an output for demodulated signal, the output of said modulation transfer means being connected to the first input of said phase detector, an oscillator operating at a frequency different from the carrier frequency of said incoming signal, the output of said amplifier being connected to said first and second inputs of said modulation transfer means, the output of said oscillator being connected to the third input of said modulation transfer means and also in proper phase to said second input of said synchronous detector, said modulation transfer means operating in response to the application of incoming signal and of signal from said oscillator to develop in the output of said transfer means signal having a carrier frequency exactly equal to the frequency of the signal from said oscillator and having significant side bands within a range of frequencies that is much more narrow than the range occupied by the incoming signal, and said phase detector providing substantially linear demodulation over said narrow band of frequencies for supplying demodulated signal to its output while said detector system retains favorable signal-to-noise ratio resulting from wide deviation of said incoming signal.

2. A synchronous detector system for demodulating angular-modulated signals comprising: a modulation transfer means of the type that has first and second mixers, each of said mixers having first and second inputs and an output, means for applying amplifier incoming angular-modulated signal to the second input of each of said first and second mixers, means for changing the phase of a selected beat frequency signal in the output of said first mixer relative to the phase of incoming signal applied to its second input and then applying said beat frequency that is changed in phase to the first input of said second mixer; a synchronous phase detector having a signal input, a reference input and an output, an oscillator having its output connected to said first input of said first mixer and to said reference input of said phase detector, phase shifting means connected to said oscillator for shifting the phase between the signal applied to said first input of said first mixer and the signal applied to said reference input of said phase detector, means for applying from the output of said second mixer to the signal input of said phase detector a carrier frequency of the same frequency as that of said oscillator with modulation sidebands determined by said incoming signal but confined within a relatively narrow range of frequencies, and said phase detector supplying demodulated signal to its output while said detector system retains favorable signal-to-noise ratio resulting from wide deviation of said incoming signal.

3. A synchronous detector system for demodulating frequency-modulated signals that have wide frequency deviations of modulation comprising: a modulation transfer circuit of the type that has an input mixer, a first band-pass filter, a time delay line, and a linear mixer, said input mixer and said linear mixer each having an output and first and second inputs, the output of said input mixer being connected through said first band-pass filter and said time delay line to said first input of said linear mixer; a phase detector of the synchronous type having a signal input and a reference input, an oscillator, the output of said oscillator being connected to said first input of said input mixer and also being connected through a phase shifter to said reference input of said phase detector, a second band-pass filter, a limiter, the output of said linear mixer being connected through said second band-pass filter and said limiter to said signal input of said phase detector, an intermediate-frequency amplifier having an output connected to said second inputs of said input and linear mixers of said modulation transfer circuit to apply frequency-modulated signal with wide frequency deviations of modulation to said mixers, said modulation transfer circuit functioning in response to the application of signals from said intermediate-frequency amplifier and said oscillator to transfer intelligence of said frequency-modulated signal to phase modulated signal having a center frequency corresponding to the frequency of signal applied from said oscillator and having its sidebands contained within a relatively narrow frequency band, and the frequencies of the signals to both said first and second inputs of said detector being determined by said oscillator to maintain linearity of demodulation of said synchronous phase detector independent of drift in frequencies of said frequency-modulated signal and of said oscillator.

4. A synchronous detector system according to claim 3 in which said intermediate-frequency amplifier has an automatic-gain-control input, an automatic-gain-control phase detector for developing output control voltage as a function of amplitude of said frequency-modulated signal, said automatic-gain-control phase detector having one input connected to the output of said modulation transfer circuit, another input connected to the output of said oscillator and an output connected to said automatic-gain-control input.

References Cited by the Examiner

UNITED STATES PATENTS

| | | | |
|---|---|---|---|
| 2,093,871 | 9/37 | Levin | 325—435 |
| 2,735,001 | 2/56 | Witters | 325—432 |
| 3,119,067 | 1/64 | Wohlenberg et al. | 325—477 |

FOREIGN PATENTS

| | | |
|---|---|---|
| 908,209 | 10/62 | Great Britain. |

DAVID G. REDINBAUGH, *Primary Examiner.*